US012366545B2

(12) United States Patent
Rahimi (10) Patent No.: US 12,366,545 B2
(45) Date of Patent: Jul. 22, 2025

(54) LASER ABLATED WIRELESS HUMIDITY SENSOR

(71) Applicant: Purdue Research Foundation, West Lafayette, IN (US)

(72) Inventor: Rahim Rahimi, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 324 days.

(21) Appl. No.: 18/103,592

(22) Filed: Jan. 31, 2023

(65) Prior Publication Data
US 2023/0358700 A1    Nov. 9, 2023

Related U.S. Application Data (60) Provisional application No. 63/326,028, filed on Mar. 31, 2022.

(51) Int. Cl.
| | |
|---|---|
| *G01N 27/00* | (2006.01) |
| *B23K 26/21* | (2014.01) |
| *B23K 26/38* | (2014.01) |
| *G01N 27/22* | (2006.01) |

(52) U.S. Cl.
CPC .......... *G01N 27/223* (2013.01); *B23K 26/21* (2015.10); *B23K 26/38* (2013.01)

(58) Field of Classification Search
CPC ....... G01N 27/223; B23K 26/21; B23K 26/38
See application file for complete search history.

(56) References Cited

U.S. PATENT DOCUMENTS

| | | | | |
|---|---|---|---|---|
| 2009/0308155 A1* | 12/2009 | Zhang | ................. | G01N 27/223 |
| | | | | 73/335.02 |
| 2021/0123879 A1* | 4/2021 | Durupt | ................. | G01N 27/226 |

OTHER PUBLICATIONS

Kampczyk, A. et al., "The Fundamental Approach of the Digital Twin Application in Railway Turnouts with Innovative Monitoring of Weather Conditions," Sensors (2021) 21, 5757, pp. 1-14, 21, 5757.
Gao, W. et al., "Flexible Electronics toward Wearable Sensing," Accounts of Chemical Research, (2019) 52, 523-533.
Dai, Y. et al., "A Flexible Multi-Functional Smart Skin for Force, Touch Position, Proximity, and Humidity Sensing for Humanoid Robots," IEEE Sensors Journal, vol. 21, No. 23, Dec. 1, 2021, pp. 26355-26363.
Huo, Y. et al., "A survey of in-vehicle communications: Requirements, solutions and opportunities in IoT," Proceedings of the 2015 IEEE 2nd World Forum on Internet of Things (WF-IoT), Milan, Italy, Dec. 14-16, 2015.

(Continued)

*Primary Examiner* — Jamel E Williams
(74) *Attorney, Agent, or Firm* — Purdue Research Foundation (57) ABSTRACT

A humidity sensor may include a metalized substrate comprising a laser ablated portion and a remaining metal portion. The remaining metal portion may include a spiral inductor and an interdigitated capacitor. The interdigitated capacitor may be coupled in parallel with the spiral inductor. The interdigitated capacitor may be centrally positioned with respect to the spiral inductor and surrounded by spirals of the spiral inductor. The spiral inductor and interdigitated capacitor may be formed by selectively ablating the metallized substrate to define the inductor and capacitor.

14 Claims, 5 Drawing Sheets

(56) References Cited

OTHER PUBLICATIONS

Navarro, E. et al., "A Systematic Review of IoT Solutions for Smart Farming," Sensors (2020), 20, 4231.
Nižetić, S et al., "Internet of Things (IoT): Opportunities, issues, and challenges towards a smart and sustainable future," Journal of Cleaner Production, 274 (2020), 122877.
Sundriyal, P. and Bhattacharya, S., "Inkjet-Printed Sensors on Flexible Substrates," Energy, Environment, and Sustainability. Environmental, Chemical and Medical Sensors, Bhattacharya, S. et al. editors, Springer (2018), Chapter 5, pp. 89-113.
Liu, C. et al., "3D Printing Technologies for Flexible Tactile Sensors toward Wearable Electronics and Electronic Skin," Polymers (2018), 10, 629.
Zareei, A. et al., "Highly Conductive Copper—Silver Bimodal Paste for Low-Cost Printed Electronics," ACS Applied Electronic Materials (2021), vol. 3, pp. 3352-3364.
Khaleel, H. et al., "Compact Polymide-Based Antennas for Flexible Displays," Journal of Display Technology, vol. 8, No. 2, Feb. 2012, pp. 91-96.
Aparecida de Araujo Andreotti, I. et al., "Disposable and flexible electrochemical sensor made by recyclable material and low cost conductive ink," Journal of Electroanalytical Chemistry, (2019), vol. 840, pp. 109-116.
Talapin, D. V. et al., "Introduction: Nanoparticle Chemistry," Chemical Reviews, ACS Publications, (2016), vol. 116, pp. 10343-10345.
Kim, Y. et al., "Capacitive humidity sensor design based on anodic aluminum oxide," Sensors and Actuators B: Chemical, (2009), vol. 141, pp. 441-446.
Balde, M. et al., "Fabrication of porous anodic aluminium oxide layers on paper for humidity sensors," Sensors and Actuators B: Chemical, (2015), vol. 220, pp. 829-839.
Sedaghat, S. et al., "Laser-induced atmospheric CuxO formation on copper surface with enhanced electrochemical performance for non-enzymatic glucose sensing," Journal of Materials Chemistry C, (2021), vol. 9, No. 42, pp. 14997-15010.
Sedaghat, S. et al., "Laser-Induced Mesoporous Nickel Oxide as a Highly Sensitive Nonenzymatic Glucose Sensor," ACS Applied Nano Materials, (2020), vol. 3, pp. 5260-5270.
Cordier, F. et al., "X-ray Photoelectron Spectroscopy Study of Aluminium Surfaces Prepared by Anodizing Processes," Surface and Interface Analysis, (1995), vol. 23, pp. 601-608.
Krishnakumar, A. et al., "A facile microwave synthesis of rGO, ZrO2 and rGO-ZrO2 nanocomposite and their room temperature gas sensing properties," Journal of Materials Science: Materials in Electronics. Springer (2019), vol. 30, pp. 17094-17105.
Bartolucci, S. F. et al., "Graphene-aluminium nanocomposites," Materials Science and Engineering A, (2011), vol. 528, pp. 7933-7937.
Favaro, L. et al., "Experimental and ab initio infrared study of χ-, κ- and α-aluminas formed from gibbsite," Journal of Solid State Chemistry, (2010), vol. 183, pp. 901-908.
Razavi-Tousi, S.S. et al., "Modifying aluminum—water reaction to generate nano-sized aluminum hydroxide particles beside hydrogen," Powder Technology, (2013), vol. 241, pp. 166-173.

\* cited by examiner

LASER ABLATED WIRELESS HUMIDITY SENSOR

CROSS REFERENCE TO RELATED APPLICATIONS

This application claims the benefit of U.S. Provisional Application No. 63/326,028 filed Mar. 31, 2022 which is incorporated by reference herein in its entirety.

TECHNICAL FIELD

This disclosure relates to sensors and, in particular, to humidity sensors.

BACKGROUND

Nearly one-third of all food produced in the world for human consumption (~1.3 billion tons), worth US$990 billion, is thrown away each year, due to improper packaging, random food deterioration, and spoilage. Smart packaging technologies with integrated sensors that can monitor the quality of the product as well as the package play a vital role in reducing food waste by maximizing the shelf life of products and by notifying consumers of accurate information about the packaged product. One of the major causes of food spoilage is the presence of excess moisture in the package of both fresh (i.e., fruits and vegetables) and dried products. Moisture absorbent pads, sheets, and blankets are often used to wick away the excess liquid from fresh foods, such as fish, meat, fruits, and vegetables. Dried products (i.e., cereal, oats, and wheat) are often packed with protective atmosphere gases such as carbon dioxide ($CO_2$) and nitrogen ($N_2$) with the aim of extending the shelf life by minimizing chemical deterioration and possible growth of aerobic spoilage microbes inside the packaged food. While simple standardized expiration dates have been determined based on the materials used in the packaging of food products, most of these "expiration dates" are based on cautious estimates, and in most cases, the food product can be consumed well after these dates. Furthermore, the possibility of food spoilage due to damages in the package is not usually taken into account.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Over the past few years, the rapid growth of the Internet of Things (IoT) systems has allowed ambient monitoring systems to be developed as part of a distributed network. The recent advances in the seemingly independent fields of mm-wave technologies and IoT have produced large sets of high-performance components and tools, as well as new avenues for the introduction of novel systems, concepts, and applications. Some of the best examples of commercially available IoT systems used for humidity sensing are UbiBot's IoT sensors and Arduino Oplà kit. UbiBot's IoT sensors can operate in the temperature range $-20°$ C. to $+60°$ C. to monitor humidity in the range of 10% to 90% fRH and can communicate with smart devices using WiFi. The Arduino Oplà kit integrates MKR Wi-Fi 1010 board with onboard sensors to provide a personalized weather station for home applications by gathering temperature and humidity levels and wirelessly transmitting the collected data to the user. NFC (Near Field Communication) tags that work based on inductive coupling at 13.54 MHz have also been used for sensing applications due to the portability and handiness of the reader as the tag readers can be integrated onto ubiquitous devices such as cellphones. While NFC tag readers are available on cellphones and can be used for portable applications, NFC sensor tags work based on load modulation techniques and require additional (Application Specific Integrated Circuits) ASICs to transmit digitized information. The addition of chips onto the sensor increases the cost of the device as well the manufacturing process as it requires a supplementary step to assemble them onto the sensor. Moreover, since the frequency of NFC tags is limited to 13.54 MHz, the resonant frequency shift cannot be tracked, and digitized transmission based on load modulation techniques increases the complexity of data reception. The last decade has also witnessed the multidisciplinary—progress of flexible electronics, and its use in low-cost environmentally friendly fabrication of wearable systems and ubiquitous smart skinshas already motivated its use for numerous IoT systems.

Although the technologies for remote sensing and wireless communication approaches have matured and have been widely used for automobiles, and agriculture, their use in packing goods is rare as not being economically feasible due to the cost of components and fabrication process. In addition, remote sensing works based on far-field techniques where FCC (Federal Communications Commission) regulations limit the transmission power and resonant frequency range of the reader antenna which puts a restriction on the sensitivity of measurements as a larger resonant frequency range is preferred for higher resolution in sensor performance. Furthermore, the manufacturing process of the sensors used in such devices often requires time-consuming and costly photolithography processes and slow small-scale electrochemical anodization approaches which are the limiting factors projected to challenge their potential use in smart food package monitoring applications.

On the other hand, recent advancements in scalable manufacturing processes such as inkjet printing and 3D printing have provided unprecedented opportunities in the development and manufacturing of low-cost sensors. While printing technologies have been primarily used in the publishing and packaging industries, they have recently re-emerged as a possible technology in the manufacturing of low-cost, disposable sensors and electronics. The development of different conductive and semiconducting inks in combination with high-precision inkjet systems has demonstrated the possibility of printing antennas for flexible displays and sensors for electrochemical and ambient monitoring applications.

While printed sensors benefit from the simplified manufacturing processes, their fabrication process requires depositing microscale patterns of conductive traces and sensing material in the form of suspended nanoparticles in low viscosity inks. Therefore, several approaches for the synthesis of nanoparticles have been explored, including chemical methods, thermal plasma synthesis, and emulsion combustion methods. Although various nanoparticles have been made using such approaches, their inks being suspensions suffer from the inherent limitations, such as the lack of stability, limited shelf life, and susceptibility to agglomeration, that can ultimately result in the clogging of the print head nozzle.

One of the alternative approaches to inkjet printing technology is laser ablation. Lasers provide the unique ability to selectively deliver a confined large amount of energy into a material over a short time which can lead to numerous alterations in the material properties, such as etching, cutting, welding, and modifying surface morphology. Laser etching has been used in the production of low-cost disposable sensors such as glucose sensor, urine activity and dissolved ion detector, and sweat monitoring systems. Laser processing has also been used for manufacturing sensors for moisture monitoring in soil and plants. Another example is its use in patterning ITO coated films for flexible transparent displays using a transparent capacitive touch sensor array. Furthermore, laser irradiation can also be used in the green synthesis of metal oxide nanoparticles, where the laser beam provides a sufficient level of energy to break down the targeted metal. Synthesis of metal oxide using laser ablation has many advantages compared to other approaches including process simplicity, cost-effectiveness, and high purity. Moreover, it also eliminates the use of complex reagents and the production of hazardous wastes. Although several reports have investigated the use of both laser etching and synthesis of metal oxide nanoparticles as individual processing methods, comparatively few studies have investigated their combination in low-cost electronics devices and sensors.

The wireless sensor reported in the system and methods descried herein is may include an inductive-capacitive resonant circuit that is directly laser etched onto the aluminum layer of a commercially available substrate. The metal layer (e.g. ~10 µm thick aluminum) provides a moisture sensitive layer as well as a highly conductive metallic trace critical for wireless sensors. The rapid laser processing technology and inexpensive materials used in this process allow the sensors to be fabricated economically thereby making them suitable for disposable packaging applications where the cost of production is crucial for the viability of the technology. Furthermore, a wireless technology based on near field communications does not have the restrictions of far-field techniques in terms of the transmission frequency range as the radiation pattern of near field devices is limited to within 1 cm from the source of radiation which causes no interference with the commercial bands making it suitable for real life applications.

Figure 1:
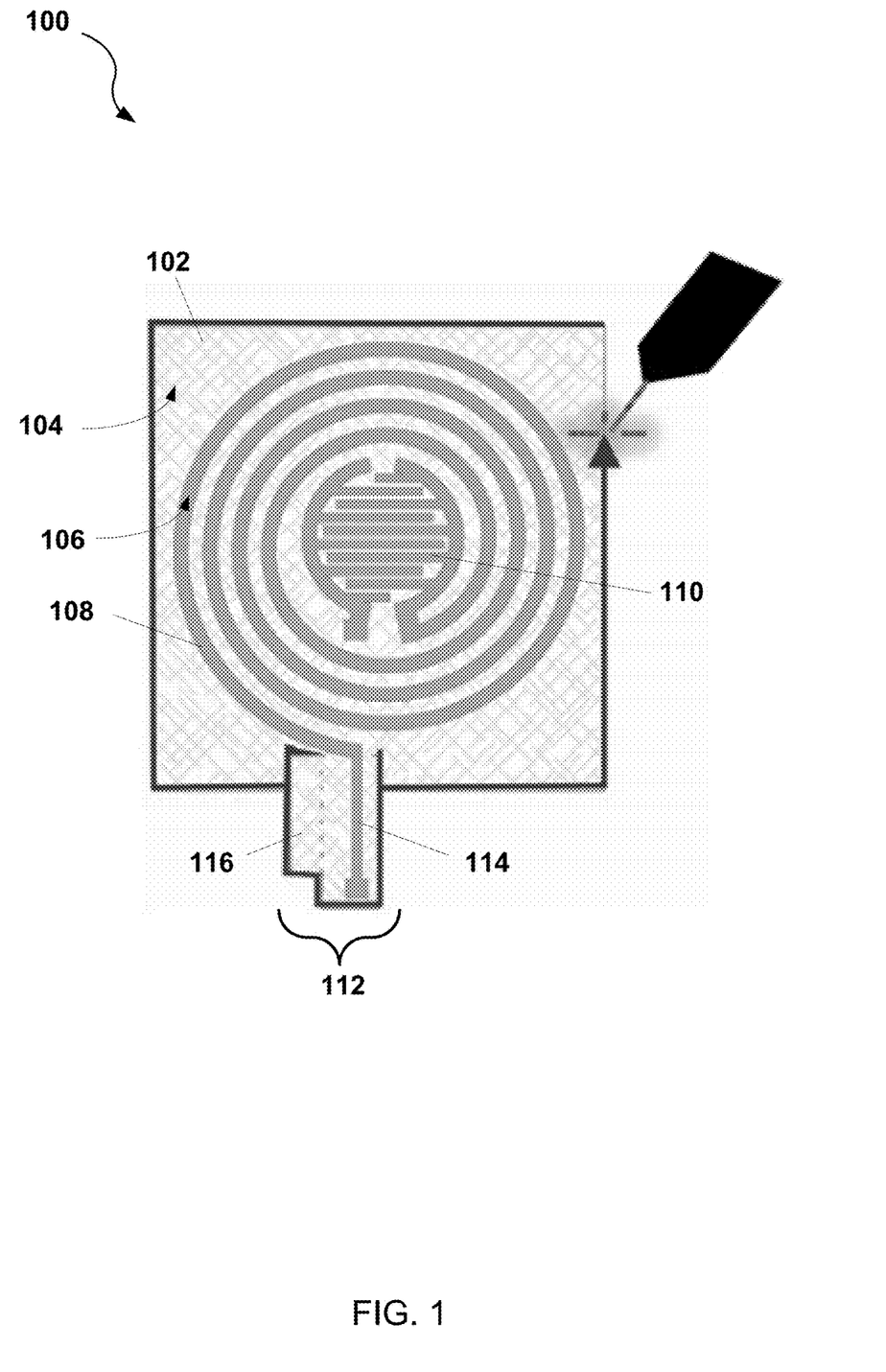
FIG. 1 illustrates an example of a humidity sensor.

FIG. 1 illustrates an example of a humidity sensor. The sensor may include a metalized substrate 102 comprising a laser ablated portion 104 and a remaining metal portion 106. The remaining metal portion may be unablated by the laser. The remaining metal portion may include a spiral inductor 108 and an interdigitated capacitor (IDC) 110. The spiral inductor 108 and interdigitated capacitor 110 may be defined by the laser ablated portion. That is, after ablating a metallic surface of the substrate, the remaining metal surface 106 after the ablating may form the spiral inductor 108 and interdigitated capacitor 110. The interdigitated capacitor 110 may be connected in parallel with the spiral inductor and centrally positioned with respect to the spiral inductor 108. The interdigitated capacitor 110 may be surrounded by spirals of the spiral inductor 108.

In some examples the substrate 102 may include a parchment paper or some other non-conductive material and a metal coating (i.e. aluminum). The IDC 110 as well as the inductive coil 108 may be patterned in a single step where laser ablation leads. In examples where the metal coating is aluminum, the laser ablation may cause evaporation of a portion of Al while oxidizing the remaining portion in the presence of heat to form alumina. While alumina formation occurs in both the inductive coil area as well as the IDC area, since the IDC structure may comprise fingers placed very close to one another, the effect of moisture in the IDC area will be considerably more pronounced than that in the inductive coil area. By having an inductive coil structure that represents the communication part and an IDC structure with fingers closer to each other, we can obtain a device that provides high sensitivity to moisture. The finally assembled sensor is modeled as an inductor-capacitor (LC) tank circuit. The resonant frequency ($f_s$) for this tank circuit is expressed as:

$$f_s = \frac{1}{2\pi\sqrt{L_s C_s}} \quad (1)$$

where $L_S$ is the inductance of the spiral coil, $C_S$ is the total equivalent capacitance of the IDC 110 and built-in stray capacitances induced by the spiral coil, and $R_S$ represent the capacitive loss within the IDC 110. The key humidity sensing element within this circuit is $C_S$ which is strongly dependent on the dimension of its electrodes, the gap between the electrodes, and the relative permittivity (dielectric constant) of its substrate.

In various examples, the substrate 102 may include may a silicone coating on a compressed fiber sheet to provide water and heat resistance. In contrast, the nanoporous $Al_2O_3$ structures created within the LA-Al regions have a higher surface area with hygroscopic properties that facilitate easy absorption of water molecules. Aluminum nanoparticles are suitable for humidity sensing applications because of the presence of nanosized pores, providing a large surface area for absorbing water vapor. For example, dry $Al_2O_3$ has a relatively low dielectric constant within the range of 2 to 12 as compared to water with a dielectric constant of 80. As a result, variation in the humidity levels of the sensing environment will induce a change in the moisture content of the $Al_2O_3$ nanoparticles and will result in a change in the effective dielectric constant of the IDC 110. Consequently, from Equation (1), the change in the effective dielectric constant the IDC will alter the resonant frequency of the sensor. Since the inductance of the sensor is independent of the moisture content within the substrate, the shift in the resonant frequency of the sensor is only dependent on the change in the equivalent capacitance component ($C_S$) of the sensor.

The sensor 100 may further include an interconnection trace 112. The interconnection trace 112 may connect the interdigitated capacitor 110 to the spiral inductor 108 to form a parallel connection. For example, the interdigitated capacitor may have a first side having a plurality of fingers and a second side having a plurality of fingers. The fingers of the first side may be aligned with the fingers of the second side such that the fingers alternative between first and second side. A gap may be defined between the first side an second side to form the interdigitated capacitor. The first side may be connected to an inner spiral of the spiral inductor 108. The interconnection trace 112 may connect an outer spiral of the spiral inductor 108 to the second side of the interdigitated capacitor 110.

In some examples, the interconnection trace 112 may include a lead 114 connected to an outer spiral of the spiral inductor 108. The lead 114 may be folded over the spiral 108 to connect to the interdigitated capacitor 110. A passivation layer 116 may be positioned between the lead and the spirals of the inductor such that only the contact connects to the interdigitated capacitor 110. In some examples, the passivation layer may be a laser ablated portion of the substrate folded and positioned between the lead and the spiral inductor. In the example illustrated in FIG. 1, the passivation layer 116 has not yet been folded over the lead 114. It should be appreciated that the passivation layer 116, after folding, will leave a contact of the lead exposed for connection to a corresponding contact on the second side of the interdigitated capacitor 110.

Figure 2:
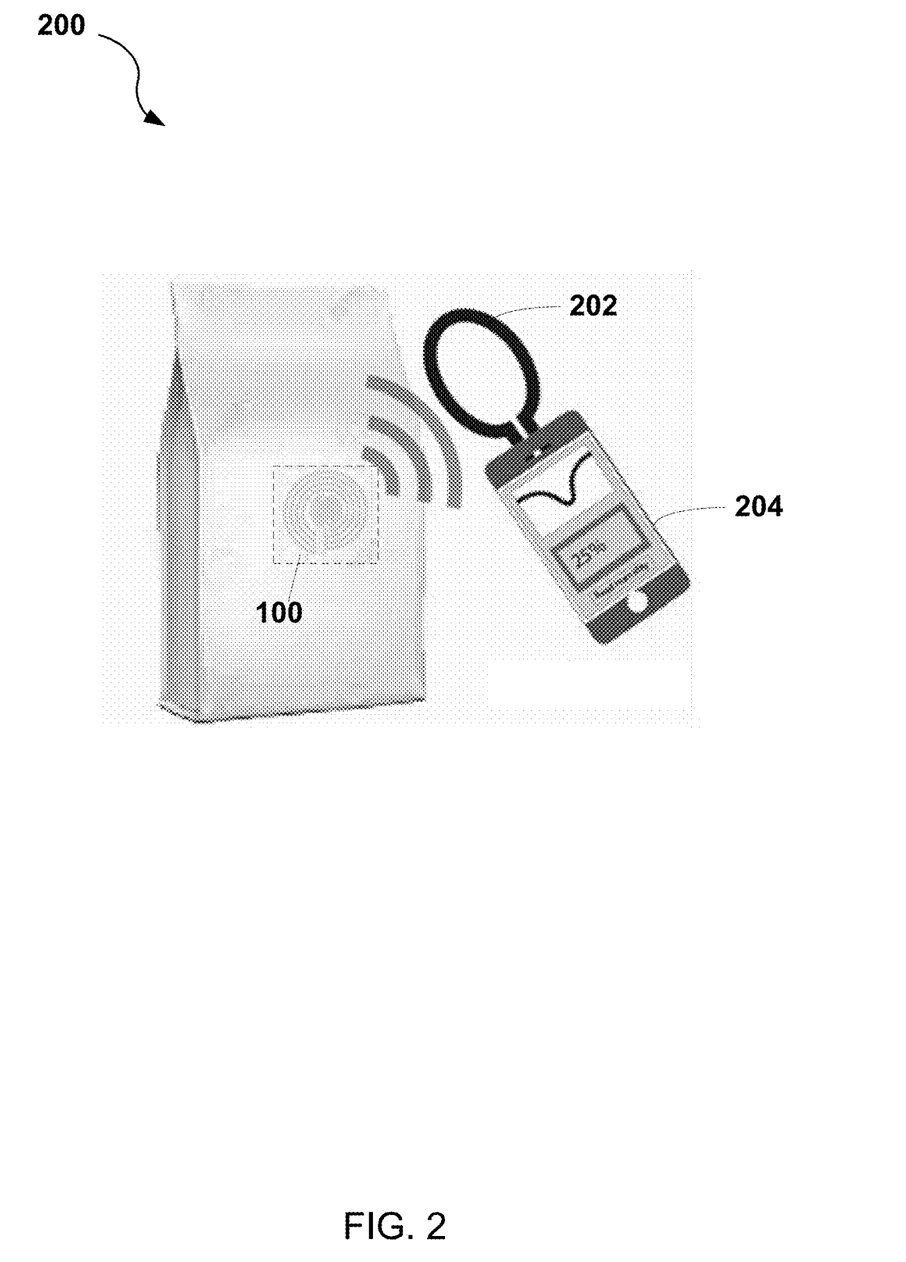
FIG. 2 illustrates an example of a system with a wireless humidity sensor.

FIG. 2 illustrates an example of a system 200 with the wireless humidity sensor 100. The sensor 100 may be located on the surface of a container and/or in inside of the container. Alternatively or in addition, the container and substrate may be integral and the metalized coating may be located directly on the container.

The resonant frequency of the sensor 100 can be wirelessly interrogated using an antenna coil 202. In some examples, the readout coil 202 may be a single loop antenna. The readout coil may be in communication with a detector device 204. To interrogate the resonant frequency of the sensor 100, the antenna with an inductance of $L_a$ is magnetically coupled with the spiral inductor ($L_S$) of the sensor. The inductive coupling between the reader antenna and the sensor's inductor powers up the LC passive humidity sensor, which eliminates the need for an onboard battery for operating the sensor 100. Using circuit analysis and transformer theory, the equivalent input impedance ($Z_{in}$) viewed from the two ports of the readout coil ($L_a$) can be calculated as:

$$Z_{in} = (R_A + R_s) + j\left(\omega L_a + \frac{1}{\omega C_s}\right) \quad (2)$$

where $R_A$ is the resistance of the loop antenna, $R_S$ is the resistance of the sensing coil, $\omega$ is the angular frequency and $C_S$ is the capacitance of the sensing coil. where the magnitude of $Z_{in}$ ($|Z_{in}|$) and phase of $Z_{in}$ ($\angle Z_{in}$) can be expressed as:

$$|Z_{in}| = \sqrt{(R_A + R_s)^2 + \left(\omega L_a + \frac{1}{\omega C_s}\right)^2} \quad (3)$$

$$\angle Z_{in} = \tan^{-1}\left(\frac{\omega L_a + \frac{1}{\omega C_s}}{R_A + R_s}\right) \quad (4)$$

Using the chain rule calculations and assuming small values of k and large values of Q, frequency minimum ($f_{min}$) of $\angle Z_{in}$ can be expressed as:

$$f_{min} = f_o\left(1 + \frac{k^2}{4} + \frac{1}{8Q^2}\right) \cong f_o \quad (5)$$

where $f_o$ is the unloaded resonant frequency, k is the damping factor, and Q is the quality factor of resonance.

Typical values for passive wireless sensing devices with zero separation distance between the sensor and readout antenna are k<0.08 and Q ranging from 40-70. Using these values, the expected difference between $f_{min}$ and $f_s$ will be less than 0.01%. Therefore, a simple phase-dip monitoring technique can be applied to wirelessly monitor changes in $f_s$ as the phase of the complex impedance $Z_{in}$ drops to its minimum value.

Figure 3:
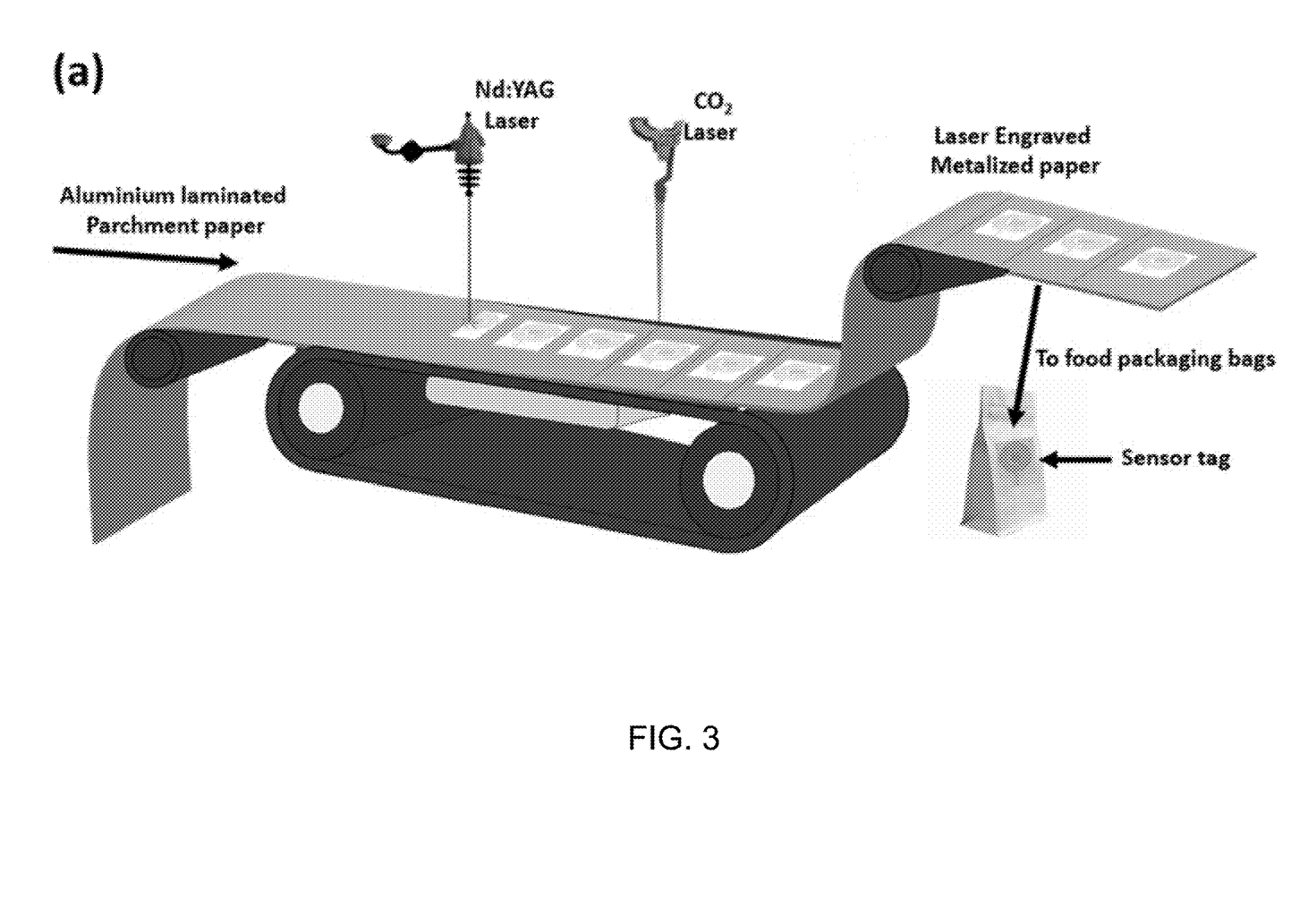
FIG. 3 illustrates an example a system for manufacturing a wireless humidity sensor.

FIG. 3 illustrates an example a system for manufacturing the wireless humidity sensor 100. In some examples, sensors can be fabricated with the help of a roll-to-roll manufacturing facility where flexible metalized films are conveyed along a roller-based processing line. The metalized films on the substrate may be laser ablated (LA) to form the required pattern and are subsequently slit to the final size of the sensor so that they can be used for packaging applications. By way of example, the manufacturing process may use a pulsed laser to perform the ablation and then a $CO_2$ laser to cut the sensors individually.

Figure 4A:
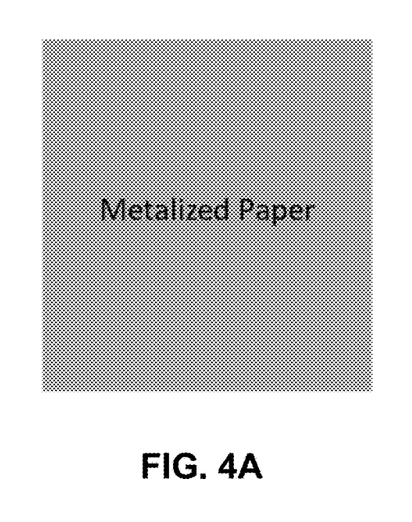
FIGS. 4A-F illustrates an example of a humidity sensor during various steps of manufacture.
Figure 4B:
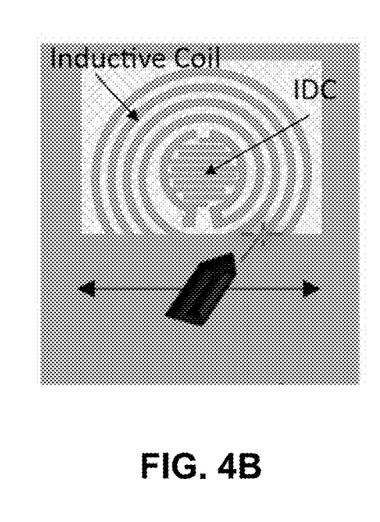
Figure 4C:
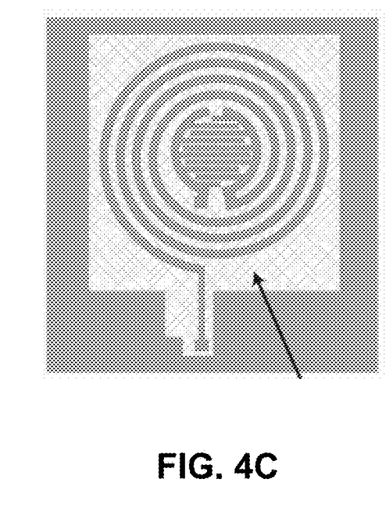

FIGS. 4A-F illustrates an example of the humidity sensor 100 during various steps of manufacture. Referring to FIG. 4A, Metalized paper may be attached to a glass (e.g. 1 mm) substrate to provide easy handling and to ensure that the paper is always within the focal point of the laser during laser ablation. Referring to FIGS. 4B-C, an interdigitated capacitor and spiral coil may be laser-etched onto the surface of the aluminum film. The interdigitated capacitor may be formed in the middle of the sensor structure and the inductive coil was formed surrounding the interdigitated structure structure. A lead for the interconnection trace may be further defined by the ablation process.

The interdigitated capacitor and spiral inductor may be formed at the same time (i.e. in the same laser pass along rows of the metalized paper) using the laser. In some examples, the laser may include a Nd: YAG pulsed laser. In various extermination a pulse duration and repetition frequency was set at 10 ns and 30 kHz, respectively. Also in various examples, optimum laser setters were found to be: —power=18 W and speed=5 m/s—were used to completely remove the thin film conductive aluminum while causing minimum damage to the paper substrate. It should be appreciated that other settings may be possible.

Figure 4D:
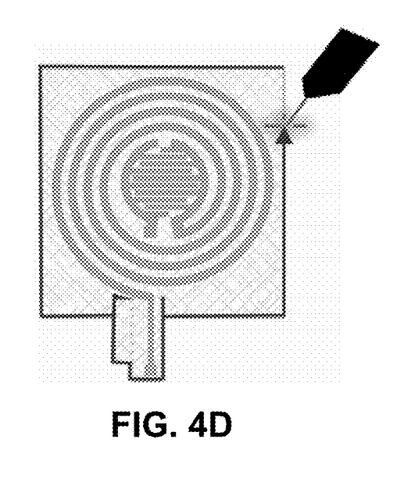

Referring to FIG. 4D, after completing the selective laser etching of the aluminum film to obtain the desired electrical patterns, a $CO_2$ laser may be used to cut through the paper substrate and release the sensor with its interconnection trace from the bulk AP (Aluminized Paper) film. In various extermination, a power of 10 W and a speed of 2 m/s was used to, though other settings are possible.

Figure 4E:
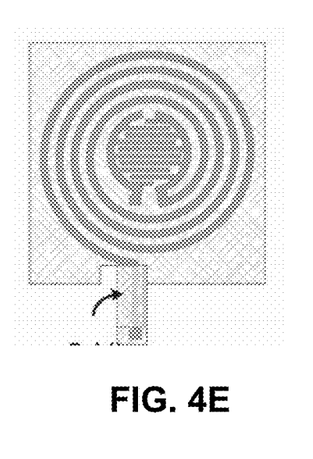

Referring to FIG. 4E, the indented part of the paper with a dashed laser cut may be folded onto the interconnecting trace of the sensor. The folded part of the paper substrate eliminated the electrical shorting of the coil by the interconnecting trace. This simple folding mechanism eliminated the need for a separate step of printing a passivation layer.

Figure 4F:
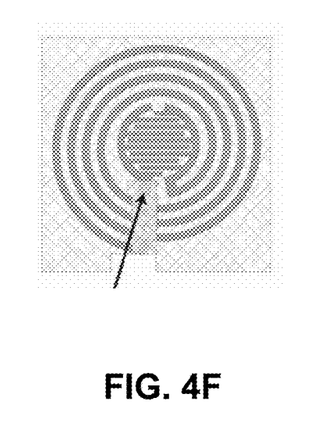

Referring to FIG. 4F, the interconnecting trace was then laid over the sensor while aligning them with the connection pads. Subsequently, a glass slide may be temporarily placed onto the device to secure the interconnection trace onto the sensor. The electrical connection between the IDC and inductor may be completed by laser welding the two connecting pads. For example, a Nd: YAG laser set at a power and speed of 18 W and 2 m/s, respectively was used in various extermination. The low observability of the glass and paper substrate at low wavelengths (~1.06 um) allows the laser beam to pass through the top two layers and only be absorbed by aluminum films at the center. The laser beam provides a concentrated heat at the interface of the two conductive aluminum films and fuses them.

After the laser welding, the top glass layer may be removed. FIG. 4g shows the commercial MP fabricated according to the methods described herein. Also shown are some examples of coils with different numbers of turns, and the wireless humidity sensor with the built-in IDC after laser ablating the metal coating with the Nd: YAG laser. FIG. 4h shows the final wireless humidity sensor of size 3 cm×3 cm. FIG. 4i shows how the sensor was integrated into a packaged bag to monitor the moisture content of roasted coffee beans contained inside the bag.

Figure 5:
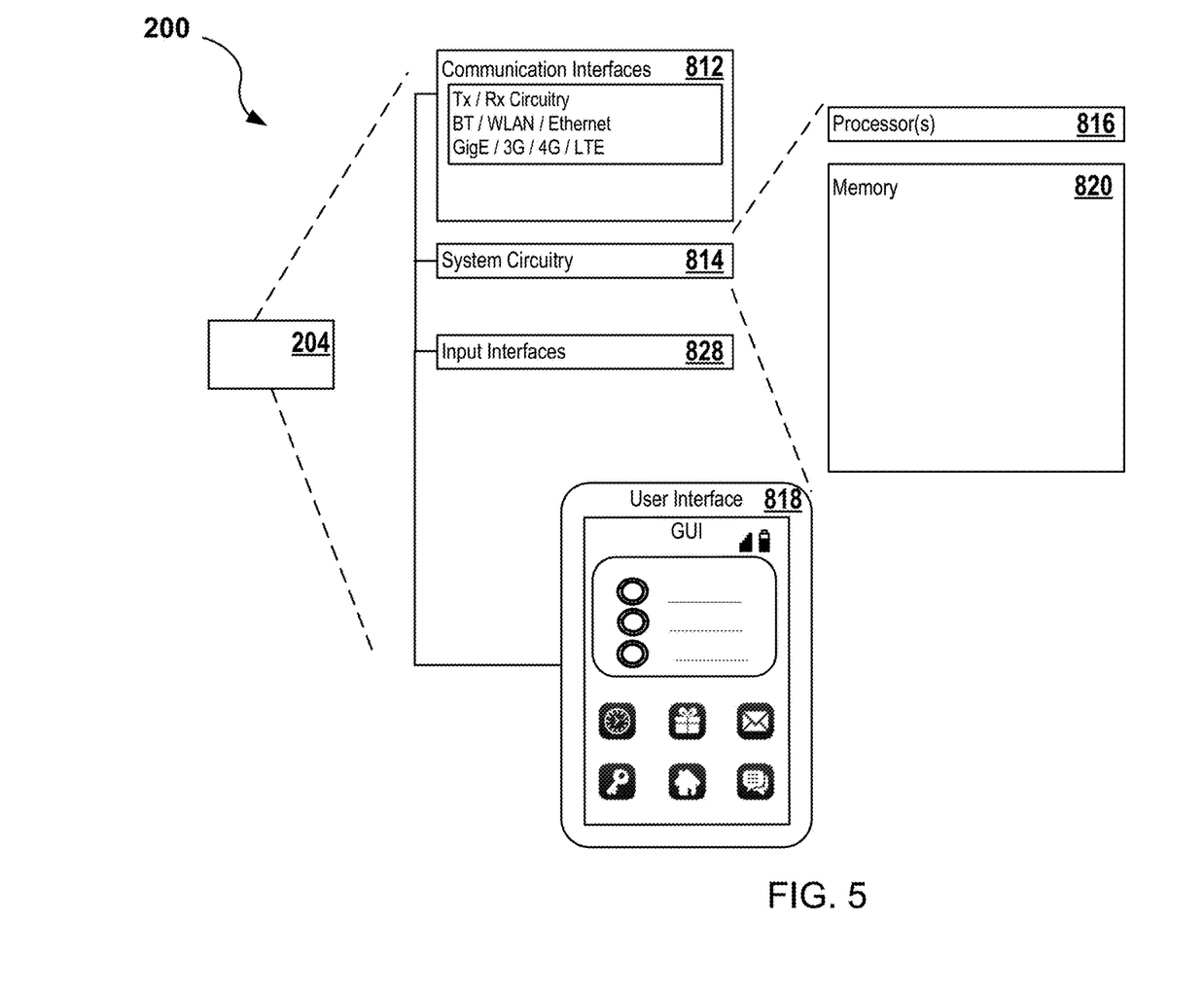
FIG. 5 illustrates an example of a system with a detector device for a wireless humidity sensor.

FIG. 5 illustrates an example of a system 200 with the detector device 204. The system 200 may include communication interfaces 812, input interfaces 828 and/or system circuitry 814. The input coil 202 (described in reference to FIG. 2) may be included in the communication interface 818. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the system 200. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 200 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 200 may be implemented in many different ways. In some examples, the system 200 may be implemented with one or more logical components. For example, the logical components of the system 200 may be hardware or a combination of hardware and software. The logical components may include the IP storage 110, the executable(s) 122, the input parameter(s) 114, runtime engine 116, the collaboration session 118, the security framework 122, the descriptor storage 128, the results storage 130, the cloud environment 102, or any component or subcomponent of the system 200. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method for manufacturing a humidity sensor, comprising:
   selectively ablating, with a laser, a metal coated substrate to define an inductor and an interdigitated capacitor in a remainder of the metal surface which is not ablated, the inductor having spirals surrounding the interdigitated capacitor.

2. The method of claim 1, wherein the inductor and interdigitated capacitor comprise Al and the etched surface comprises $Al_2O_3$ formed by the laser ablation.

3. The method of claim 1, further comprising:
   cutting away a portion of the substrate having the inductor and interdigitated capacitor.

4. The method of claim 1, wherein ablating the metal coated substrate further comprises:
   defining a first side of the interdigitated capacitor connected to an inner spiral of the inductor;
   defining a second side of the interdigitated capacitor; and
   defining a lead of the outer spiral for connecting the outer spiral to the second side of the interdigitated capacitor.

5. The method of claim 4, further comprising:
   connecting the lead of the outer spiral to the interdigitated capacitor.

6. The method of claim 5, wherein connecting the lead of the outer spiral to the interdigitated capacitor further comprises:
   folding a portion of the ablated surface over a portion of the lead of the outer spiral; and
   folding a portion of the substrate and the folded portion of the ablated surface over the spirals of the inductor thereby connecting the lead of the inductor to the second side of the interdigitated capacitor, wherein the folded portion of the ablated surface forms a passivation layer between the spiral and the lead.

7. The method of claim 5, wherein connecting the lead of the outer spiral to the interdigitated capacitor further comprises:
   Laser welding the lead to the second side of the interdigitated capacitor.

8. A humidity sensor comprising
   a metalized substrate comprising a laser ablated portion and a remaining metal portion, wherein the remaining metal portion comprises:
   a spiral inductor;
   an interdigitated capacitor, the interdigitated capacitor coupled in parallel with the spiral inductor, the interdigitated capacitor centrally positioned with respect to the spiral inductor and surrounded by spirals of the spiral inductor;

a lead connected to an outer spiral of the spiral conductor, wherein the lead is folded over the spiral inductor to connect the lead to the interdigitated capacitor; and a passivation layer is positioned between the lead and the spirals of the spiral inductor.

9. A humidity sensor comprising:

a metalized substrate comprising a laser ablated portion and a remaining metal portion, wherein the remaining metal portion comprises:

a spiral inductor;

an interdigitated capacitor, the interdigitated capacitor coupled in parallel with the spiral inductor, the interdigitated capacitor centrally positioned with respect to the spiral inductor and surrounded by spirals of the spiral inductor, wherein the laser ablated portion comprises $Al_2O_3$ and the remaining metal portion comprises Al.

10. The humidity sensor of claim 8, wherein the passivation layer comprises the laser ablated portion folded and positioned between the lead and the spiral.

11. A system comprising:

a container;

a passive humidity sensor attached to a surface of the container; the passive humidity sensor comprising a metalized substrate having a laser ablated surface which defines a spiral inductor encircling an interdigitated capacitor, the interdigitated capacitor connected in parallel to the spiral inductor; and a processor, the processor configured to:
transmit an interrogation signal to the humidity sensor;
receive a response signal from the humidity sensor; and
determine, based on the response signal, a humidity measurement.

12. A system comprising:

a container having a surface, wherein at least a portion of the surface is a passive humidity sensor defined directly on the surface, the passive humidity sensor comprising a metalized substrate having a laser ablated surface which defines a spiral inductor encircling an interdigitated capacitor, the interdigitated capacitor connected in parallel to the spiral inductor; and a processor, the processor configured to:
transmit an interrogation signal to the humidity sensor;
receive a response signal from the humidity sensor; and
determine, based on the response signal, a humidity measurement.

13. The system of claim 11, wherein the metalized substrate comprises a laser ablated portion, the laser ablated portion comprising $Al_2O_3$ and a remaining metal portion of the metalized substrate comprising Al.

14. The system of claim 12, wherein the metalized substrate comprises a laser ablated portion, the laser ablated portion comprising $Al_2O_3$ and a remaining metal portion of the metalized substrate comprising Al.

* * * * *